United States Patent Office 3,350,264
Patented Oct. 31, 1967

3,350,264
METHOD OF CONTROLLING INSECTS IN COW BARNS AND THE LIKE AREAS
Auguste Louis de Lisle, Scottsdale, Ariz., assignor to Phoenix Gems, Inc., a corporation of Arizona
No Drawing. Filed Nov. 1, 1962, Ser. No. 234,838
9 Claims. (Cl. 167—14)

My invention relates to a method of controlling insects in and around cow barns and the like areas. My present application is a continuation in part of my prior application, Ser. No. 773,562, filed Nov. 12, 1958, now abandoned.

The planting of very large areas to a single crop and the treatment of such crop to produce maximum yield is a classic example of man's upsetting the balance of nature and causing an actual increase in insect infestation, and particularly an increase of specific kinds of insects for which the environment is favorable. In other man-made environments, particularly those involving the use of buildings and concentrations of animal life, this unbalance of natural conditions is still further accentuated. Not only is a favorable environment provided for the insects, but a made-to-order breeding area is commonly created as well. It then becomes extremely difficult, if not substantially impossible, to control insects under the postulated conditions. Thus in many areas devoted to human habitation, cockroaches and other such insects find a breeding place out of sight and reach of the occupants, and normally are on the premises only during the night hours. Infestation may be exceedingly great with prospect of spreading disease and other marked disadvantages without an occupant knowing anything about it. Treatment of the runways in which the insects are found normally has no effect on the breeding areas, and even a fairly extensive campaign of eradication is followed soon by a new and vigorous infestation.

In the case of dairy barns and the like premises where a herd of milk cows is maintained, infestation by flies becomes a serious matter, although other insects are usually present as well. The common housefly may be the principal offender, but an area in which cows are held soon attracts practically all environmental flies, including so-called faceflies, hornflies, heelflies, horseflies, blowflies and the like, using the popular terminology in each case. The flies will frequently disperse during most parts of the day but will be found in very heavy concentrations at various times usually toward evening in the milkhouse, the milkbarn, the loafing barn or exercise area, in food storage areas and the like. In the milking area, for example, it is not uncommon for flies to be so thick on the ceiling and parts of the walls as to conceal entirely the space on which they are resting. It is a common practice to spray these flies with a toxic insecticide such as DDT if tolerance has not developed, or other modern toxic insecticides such as malathion or even dieldrin in some instances. This causes a quick knockdown and quick kill so that milking can be carried out after the killed flies are swept up from the floor.

The killing of large numbers of flies in the manner described is not an effective control, but only a stop-gap, temporary expedient. Flies multiply very rapidly in many areas around such conditions, particularly in piles of excreta. Attempts have been made to provide a suitable larvacide to prevent such breeding, but these attempts have been completely unsatisfactory. Thus, regardless of the kill, there is always a very large new fly population to take the place of the killed flies in and around the buildings and on the cows themselves.

Not only is the method now employed for controlling flies in dairies and the like ineffective for the purpose, but the use of toxic insecticides, even when handled with considerable care, almost always results in some contamination of the milk with either the insecticide itself or a toxic by-product thereof resulting from the breakdown of the insecticide in the cow's body. Since the Department of Agriculture has set up a zero tolerance for such materials in milk, control of insects in and around dairy barns and all fodder and food consumed by the cows by means of a synthetic toxic insecticide is substantially impossible of accomplishment without the introduction of at least some poisonous matter into the milk itself. The problem has become so serious that it is indeed rare at this time to find any substantial amount of milk which does not contain at least traces, and at times relatively very high content, of toxic materials derived from insecticides.

The principal object of the present invention is the provision of an improved method for controlling insects in and around dairy barns and other areas involving buildings used for temporary or continuous animal occupation.

Another object is to provide an improved means for controlling the fly content in and around dairy barns and the like.

I accomplish the objects of the invention by the application of relatively heavy applications of a powdered diatomite material, preferably one having the following specification:

|  | Minimum | Maximum |
| --- | --- | --- |
| Moisture, percent | 1.5 | 3.0 |
| Dry Density, lbs./cu. ft. | 20.0 | 24.0 |
| Mesh, percent Retained on 325 | 9.0 | 13.0 |
| Silica ($SiO_2$), percent | 80.00 |  |
| Crystobalite, percent: |  |  |
| Surface Area, cm.$^2$/gram | 20,000 | 30,000 |
| Brightness | 60 | 75 |

While the preferred tolerance of density expressed in pounds per cubic foot is of the order shown, suitable results can also be obtained if the density is between 18 and 25 to 26 pounds per cubic foot. As a rule, the density is a function of the degree of subdivision of the particles and the proportion of diatomaceous silica present. The material which is retained on a 325 mesh screen should preferably pass a 250 to 300 mesh screen. A suitable tolerance for the silica in the specification is one or two percent on either side of 80 percent, but under some conditions, I may obtain good results if the diatomaceous silica comprises anywhere between 70 percent and 90 percent of the total.

Two interesting discoveries have been of significance in permitting full accomplishment of the objects of the invention. I have found, for example, that approximately one percent of powdered diatomite dispersed through the excreta in a relatively uniform manner will effectively prevent successful breeding in this environment. I am not aware of the biological mechanism causing this result. Powdered diatomaceous earth has a marked repellency action so far as all insects are concerned, and it may be that the presence of the diatomite has some effect in preventing the flies from laying their eggs in a medium of the type identified. It appears to me, however, that this is not a complete explanation, because merely dusting the excreta with powdered diatomaceous earth is not completely effective in preventing breeding, although it may cut down breeding to some extent. It may be that the diatomaceous earth acts as a larvacide some way or other, but this is subject to question because even some of the highly toxic insecticides actually will not function as larvacides. Effective larvacides heretofore known have been of such a character that their use in and around premises in which food is processed has been condemned as unsafe. I am inclined to believe that the diatomaceous earth may kill the larvae before they reach any significant maturity, but this theory is not borne out by observation. I have found no evidence of larvae present in the excreta when such excreta contained about one percent of powdered diatomite dispersed therein.

It is impossible to treat all excreta physically to introduce diatomaceous earth in the general proportion desired. I have found, however, that if a cow can be made to ingest diatomaceous earth equal to about ¾ percent of her food intake on a dry basis, the excreta will normally contain about 1 percent of diatomaceous earth. The diatomaceous earth can be mixed with food, placed on fodder, mixed with supplemental feeding material such as milk solids or other protein materials. The diatomaceous earth appears to be very beneficial to cows, even though little or none of the diatomaceous earth actually is assimilated. It is not necessary in most instances to mix the diatomaceous earth with the animal's food, because most cows will consume the diatomaceous earth directly if it is placed in a suitable container where it is available to them. Normally most cows will consume sufficient diatomaceous earth under these circumstances for my purposes, and percentages of diatomaceous earth over and above the suggested amount is not deleterious to the animal but is effective in preventing fly breeding in the excreta. It may be noted that the ordinary milk cow consumes approximately 30 pounds of food daily.

The premises are also dusted heavily, and the dust layer maintained by repeated dustings from time to time. The animals themselves may be dusted without harm, but there is some tendency for them to lick this dust off each other so that it will not remain in all areas. This dusting may be in part utilized for the purpose of introducing the necessary amounts of diatomaceous earth internally. By such dusting the flies and other insects are repelled, but those insects which come in contact with the diatomaceous earth will normally be killed in approximately four or five hours. Thus there is a repellency action and a killing action, both of which are significant. By dusting in and around buildings full advantage can be taken of this repellency action.

I have discovered that even though the flies and other insects may disperse during the daylight hours, they will tend to settle in large numbers on trees and buildings at night. They are particularly vulnerable under these conditions. I, therefore, prefer to do the spraying at night, particularly in and around trees and buildings in the area to kill the massed insects by contact within a period of some four or five hours after such contact.

Particularly in the beginning of a fly-control operation in a given area there may be insects massed in the milking and other areas and for quick knockdown of these flies, I prefer to use a botanical insecticide such as pyrethrum, rotenone, sabadilla, ryannia, and the like. Pyrethrum is preferred because of the ability to substitute at least in part some of its synthetically produced homologs, including pyrethrum 1, pyrethrum 2, synerin 1, synerin 2, allethrin and other synthetic products relating thereto. By this means I can obtain a quick kill without risk of toxic inclusions in the milk itself.

It is understood, of course, that in the dusting with diatomaceous earth, having a specification above identified, I include all areas, including areas where food is stored. Fodder can be dusted directly and grain in bags can also be dusted directly. If the grain is in storage in a container of any kind, it may also be treated by means of diatomaceous earth in accordance with the procedure described in my co-pending application, Ser. No. 803,824, filed Apr. 3, 1959, now abandoned. Here again the grain is protected from insect infestation, including that of so-called grain insects, and the grain so treated also provides a source of diatomaceous earth for animal ingestion purposes. The botanical insecticide may be applied in many ways, but suitably in accordance with the method disclosed in my co-pending application, Ser. No. 844,855, filed Oct. 7, 1959, now Patent No. 3,207,662. I may also employ the process and product described in Abramitis Patent 2,841,521, issued to Armour & Company.

By means of the present invention the insect population in a given area, particularly in and around cow barns and dairies, can be reduced to practically zero if we disregard fresh incursions of insects from surrounding areas. Even though insects do migrate to a substantial extent in an insect-free treated area such as may be obtained by my invention, a dairy barn or the like may be found almost free of flies as contrasted with dairies in which this method is not employed. While the invention is particularly concerned with control of flies and other insects around cow barns, the invention has other applications. Thus mixture of diatomite with excreta to reduce fly breeding is of value on ranches for horses and cattle and in other areas where animals are found. Pigs, for example, appear to benefit greatly by feedings of diatomaceous earth, and breeding in excreta is considerably reduced, usually to zero, whatever the animal.

I prefer to employ a dust when the application is made at night because the quietness of the air and the absence of updraft reduce drifting to a considerable extent. I may employ between 15 to 40 pounds per acre—or at this rate in closed areas. When the air is quiet, as little as 20 to 25 pounds is adequate. I may also employ a liquid spray containing of the order of 2 pounds of specification grade diatomaceous earth dust per gallon of water.

The scope of the invention is defined by the claims.

I claim:

1. The method of controlling flies in and around cow barns and the like, comprising feeding to cattle as a food supplement, powdered diatomite containing at least about 70% silica as $SiO_2$ so that said diatomite is dispersed in the cattle excreta to prevent the proliferation of fly larvae therein.

2. The method of controlling flies in and around cow barns and the like, comprising feeding to cattle powdered diatomite containing at least about 70% silica as $SiO_2$, in a proportion appreciably less than ¾ percent per pound of food on a dry basis, so that no less than about one percent of diatomite is uniformly dispersed in the cattle excreta to render said excreta resistant to the proliferation of fly larvae therein.

3. The method of controlling flies and other insects in improved areas, including buildings for human and/or animal use, which method comprises applying to available surfaces not less than about 20 pounds per acre of diatomaceous earth containing approximately 80 percent of diatomaceous silica, and repeating such application from time to time to maintain a coating of said diatomaceous earth on said surfaces, whereby to repel insects from such surfaces and to kill in a matter of hours insects which come into contact with the diatomaceous earth on such surfaces, and simultaneously feeding animals whose excreta is exposed on available surfaces, sufficient powdered diatomaceous earth containing at least about 70% silica to distribute the same in said excreta and markedly limit proliferation of larvae in said excreta.

4. The method defined in claim 3, wherein said diatomaceous earth is dispersed in water to form a suspension and applied to such surfaces in the form of a spray and said spray dried to form a continuous coating of diatomaceous earth, the amount of diatomaceous earth used as a spray being somewhat reduced as contrasted with that employed in a dusting operation.

5. The method as defined in claim 3, including making such applications during the dark hours to facilitate uniform spreading of the diatomaceous earth because of the quiet night air and concomitantly directly applying the said diatomaceous earth on insects which are at rest on such surfaces during the night hours.

6. A method as defined in claim 3, wherein said application of diatomaceous earth is made at night and confined to surfaces in the vicinity of such buildings, including trees and the like, on which flies settle in large numbers during a night period of rest.

7. The method of markedly reducing breeding of flies in animal excreta which comprises substantially uniformly mixing powdered diatomaceous earth in animal food causing the animal to ingest the same, whereby to cause a proportion of said diatomaceous earth so ingested to be uniformly mixed with normal excretory matter.

8. The method of controlling flies in and around cow barns and the like, comprising feeding to cattle powdered diatomite containing at least about 70% silica, whereby the cattle are benefited and about one percent of diatomite is dispersed in the cattle excreta so that fly larvae will not proliferate therein.

9. The method of controlling flies in and around cow barns and the like, comprising feeding to cattle powdered diatomite containing at least about 70% silica, in an amount appreciably less than ¾ percent per pound of food on a dry basis, whereby to uniformly disperse in the cattle excreta not less than about one percent of diatomite.

References Cited

Anthony et al.: Journal of Economic Entomology, vol. 54, pp. 406–408, June 1961.

Bartlett: Journal of Economic Entomology, vol. 44, pp. 891–896 (1951).

Brown: "Insect Control by Chemicals," published by John Wiley and Sons, Inc., New York (1951), pp. 50–55.

Eddy et al.: Journal of Economic Entomology, vol. 54, pp. 408–411, June 1961.

Eddy et al.: Journal of Economic Entomology, vol. 47, pp. 35–38, February 1954.

Handbook of Insecticide Dust, Diluents, and Carriers, 2nd ed., published by Dorland Books, Caldwell, N.J. (1955), pp. 55–70.

Hunt: "Journal of Economic Entomology, vol. 40, No. 2, pp. 215–219 (1947), American Assoc. of Econ. Ent., Menasha, Wis.

Knipling: Journal of Economic Entomology, vol. 31, pp. 315–316, April 1938.

ALBERT T. MEYERS, *Primary Examiner.*

JULIAN LEVITT, M. O. WOLK, *Examiners.*

D. MOYER, G. A. MENTIS, R. S. BARRESE,
*Assistant Examiners.*

UNITED STATES PATENT OFFICE
CERTIFICATE OF CORRECTION

Patent No. 3,350,264　　　　　　　　　　　October 31, 1967

Auguste Louis de Lisle

It is hereby certified that error appears in the above numbered patent requiring correction and that the said Letters Patent should read as corrected below.

Column 2, lines 35 to 37, strike out the colon after "Crystobalite, percent" and insert instead -- 1.0 -- oposite in the column of the tabulation headed "Maximum"; also, the last two items of the tabulation should not be shown as subordinate parts of "Crystobalite, percent" but should have the same significance and margins as the other items of the tabulation.

Signed and sealed this 26th day of November 1968.

SEAL)

Attest:

Edward M. Fletcher, Jr.　　　　　　　　　　EDWARD J. BRENNER
Attesting Officer　　　　　　　　　　　　　Commissioner of Patents